SETTLING APPARATUS

Original Filed May 11, 1965 4 Sheets-Sheet 1

INVENTOR

DANIEL R. KLOPPER

Smith & Smith Attys.

SETTLING APPARATUS

Original Filed May 11, 1965 4 Sheets-Sheet 2

INVENTOR

DANIEL R. KLOPPER

Smith & Smith
ATTYS.

SETTLING APPARATUS

Original Filed May 11, 1965 4 Sheets-Sheet 3

INVENTOR
DANIEL R. KLOPPER
Smith & Smiley
Attys.

Dec. 8, 1970
D. R. KLOPPER
Re. 27,000
SETTLING APPARATUS
Original Filed May 11, 1965
4 Sheets-Sheet 4
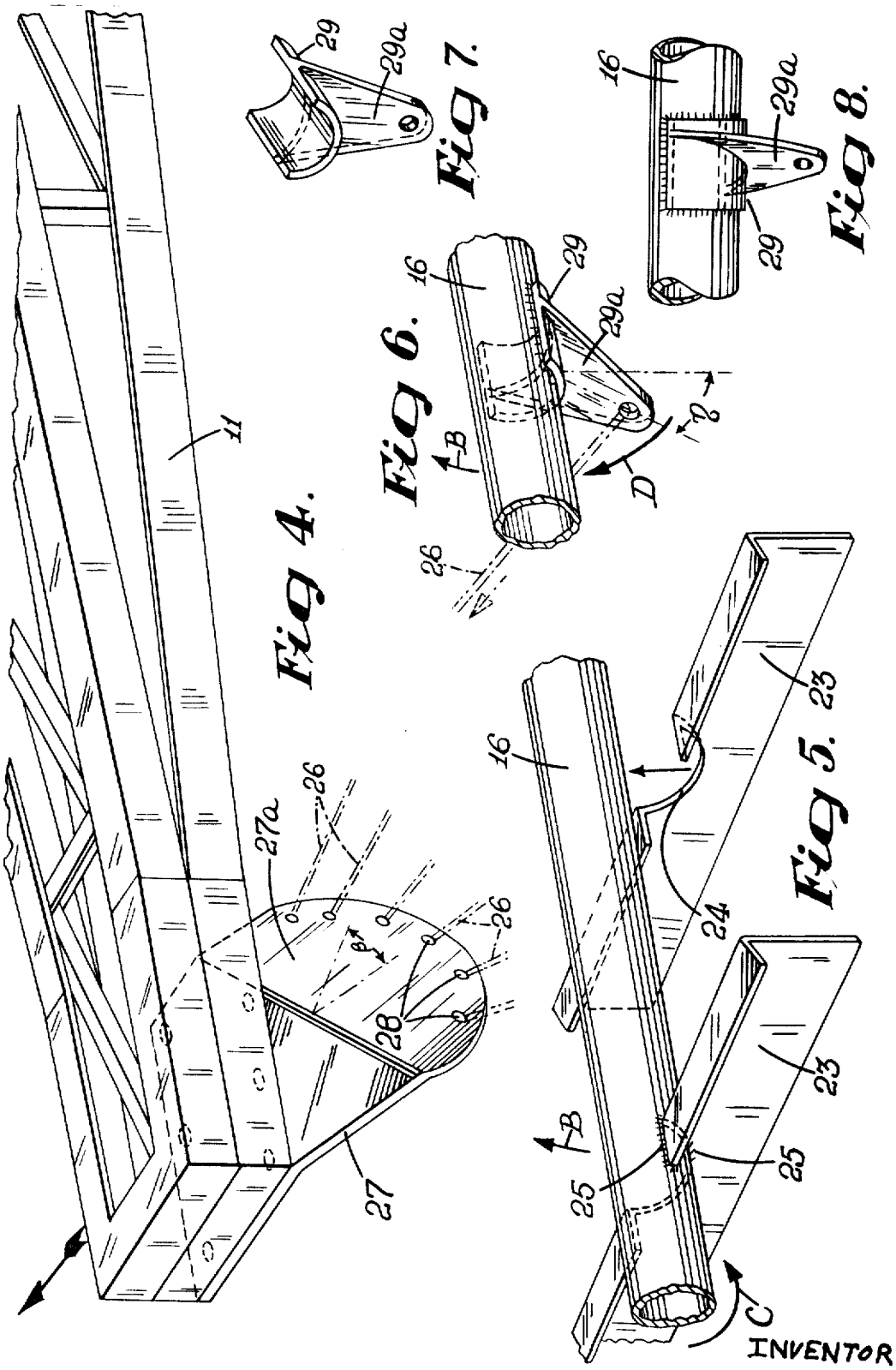
INVENTOR
DANIEL R. KLOPPER
Smith & Smiley
ATTYS.

United States Patent Office

Re. 27,000
Reissued Dec. 8, 1970

27,000
SETTLING APPARATUS

Daniel R. Klopper, Alberton, Transvaal, Republic of South Africa, assignor to Union Corporation Limited, Johannesburg, Transvaal, Republic of South Africa Original No. 3,295,835, dated Jan. 3, 1967, Ser. No. 454,946, May 11, 1965. Application for reissue Jan. 2, 1969, Ser. No. 822,074
Claims priority, application Republic of South Africa, May 22, 1964, 64/2,420
(Filed under Rule 47(a) and 35 U.S.C. 116)
Int. Cl. B01f 7/16
U.S. Cl. 259—108 23 Claims

Matter enclosed in heavy brackets [ ] appears in the original patent but forms no part of this reissue specification; matter printed in italics indicates the additions made by reissue.

*ABSTRACT OF THE DISCLOSURE*

*Raking mechanisms for use in settling apparatus wherein at least one elongated rake arm extends radially outwardly from a vertical axis of rotation, the rake arm being rotated by at least one draught element extending forwardly and upwardly from the rake arm to a drive element which rotates about said vertical axis, the rake arm being mounted at its inner end to permit the arm to swing rearwardly and upwardly about its inner end in a path which is arcuate about the drive element.*

This invention relates to settling apparatus, such as for slime, slurries, sludges or the like, which are often referred to as settlers, thickeners or clarifiers.

It is well known to provide a thickener including a settling tank, and rotary raking gear located in the tank and arranged to be rotated through fluid in the tank about a vertical axis.

Hitherto, the raking gear has been of substantial construction presenting large settlement areas for pulp, as well as large projected areas in the direction of travel which increase resistance to movement and cause disturbance of pulp in suspension. Pulp settlement increases the weight of moving parts and also the projected areas in the direction of movement, thereby increasing resistance to movement of the raking gear through the fluid and the disturbance of pulp in suspension. Under certain circumstances, pulp settlement can present serious problems.

Due to the considerable weight of the moving parts, it has hitherto been necessary to provide substantial supporting structure. As can be expected, the cost of conventional raking gear and supporting structure therefor is considerable.

In order to avoid or at least to minimize damage in the event of the raking gear encountering obstacles during travel through the fluid, it has been suggested to provide means sensitive to the load current drawn by a driving motor for the raking gear, for lifting the raking gear from its normal operating position in the tank. This arrangement suffers from the disadvantage that there is a time lag between a rise in load current due to the movement of the raking gear through the fluid being resisted, and the raking gear actually being lifted. In the result, it often happens that the raking gear has either cleared the obstacle or has been damaged by the time the lifting occurs. Also, the equipment involved is relatively complicated and expensive.

In another arrangement, drive means for the raking gear is mounted on inclined surfaces, the arrangement being such that normally the drive means is stationary whilst it rotates the raking gear, but is itself rotated against the inclination of the surfaces in opposite direction to the raking gear to lift the latter, when the reaction of driving torque exceeds a predetermined value. This arrangement is effective in minimizing damage for in the event of the resistance to movement of the raking gear becoming too high, the raking gear stops and the drive means rides up the inclined surfaces in reverse direction under the influence of the resultant reactional driving torque. However, relatively complicated and expensive equipment is required and efficiency is decreased due to stoppage of the raking gear.

It is an object of the present invention to provide improved raking means which is relatively cheap and simple in design, yet effective in operation.

According to the invention a thickener *having* [comprises] a settling tank *is characterized by* [; and] rotary raking means including at least one raking blade carrier arm located within the settling tank in required angular relationship to the horizontal and mounted towards one end for rotation about a substantially vertical axis and for pivotal movement [at least] about *its inner end* [a substantially horizontal axis]; and at least one elongated draught element secured to the carrier arm, *a* draught force acting along a closed path about the vertical axis of rotation *of* [or] the carrier arm being *applied* [applicable] to the draught element *from* [in] a position above and in advance of the carrier arm.

A plurality of draught elements may be secured to the carrier arm in positions spaced along the length of the arm, the elements converging upwardly and forwardly from the carrier arm to a common centre zone in the proximity of which draught force is applicable to the elements.

Preferably, a pair of carrier arms extend radially in opposite directions from a common substantially vertical axis of rotation and are mounted towards their inner ends for rotation together about the common vertical axis, each carrier arm further being mounted towards its inner end *to permit either carrier arm independently of the other arm to swing rearwardly and upwardly under overload conditions. Preferably, the mounting arrangement at the inner end of each carrier arm is structured to restrain the carrier arm from rotation about its own longitudinal axis.* [for individual pivotal movement independently of the other carrier arm about a substantially horizontal axis as well as about a substantially vertical axis.]

The raking means may further include a drive arm for the or each carrier arm, each drive arm being located above and in advance of its carrier arm and arranged to be rotationally driven substantially about the vertical axis of rotation of the associated carrier arm, the draught element or elements of the associated carrier arm being secured to the drive arm.

A plurality of draught elements of the or each carrier arm may be secured to the associated drive arm in a common centre zone spaced from the vertical rotational axis of the drive arm.

Raking blades of any suitable design may be mounted in any suitable arrangement along the length of the or each carrier arm.

The or each carrier arm is preferably in the form of a plain tubular member presenting a minimum settlement area for pulp and a minimum projected area in the direction of travel. The weight of the carrier arms can thus be reduced to a minimum.

The or each draught element may be secured to the associated carrier arm in such a manner that the action of draught force on the carrier arm counteracts twisting moments on the carrier arm set up by loading of the raking blades.

Thus, there may be provided for the or each draught element on its associated carrier arm, an anchor bracket fast with and extending transversely from the carrier arm, the draught element being secured to the anchor bracket in a position spaced from the carrier arm and the anchor bracket extending in a direction whereby twisting moment on the carrier arm due to draught force on the draught element acts in opposite direction to twisting moment on the carrier arm due to loading of raking blades on the carrier arm during operation.

The invention includes within its scope thickener raking means as defined above.

A preferred embodiment of the invention will now be described by way of example with reference to the accompanying drawings in which:

FIGURE 4 is a fragmentary perspective view to an enlarged scale of the outer end of a drive arm of the raking means of FIGURES 1 and 2, showing means for anchoring draught elements to the drive arm.

FIGURE 5 is a perspective view to an enlarged scale of portion of a carrier arm of the raking means of FIGURES 1 and 2, showing the mounting of raking blades on the carrier arm.

FIGURE 6 is a perspective view to an enlarged scale of portion of a carrier arm of the raking means of FIGURES 1 and 2, showing a bracket for anchoring a draught element to the carrier arm.

FIGURE 7 is a perspective view of the anchor bracket of FIGURE 6.

FIGURE 8 is an elevational view of the carrier arm portion and anchor bracket of FIGURE 6.

Figure 1:
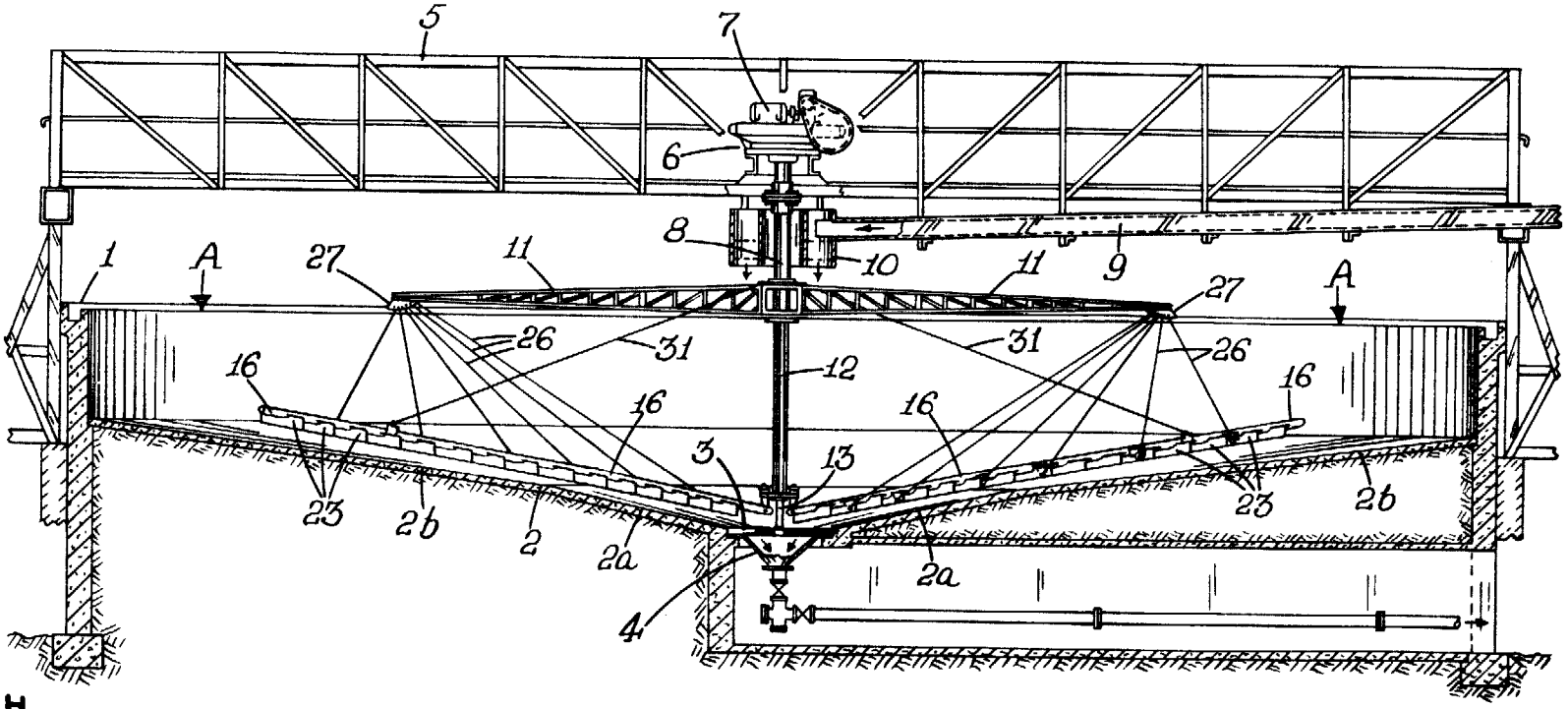
FIGURE 1 is a sectional elevation of a thickener incorporating raking means according to the invention.
Figure 2:
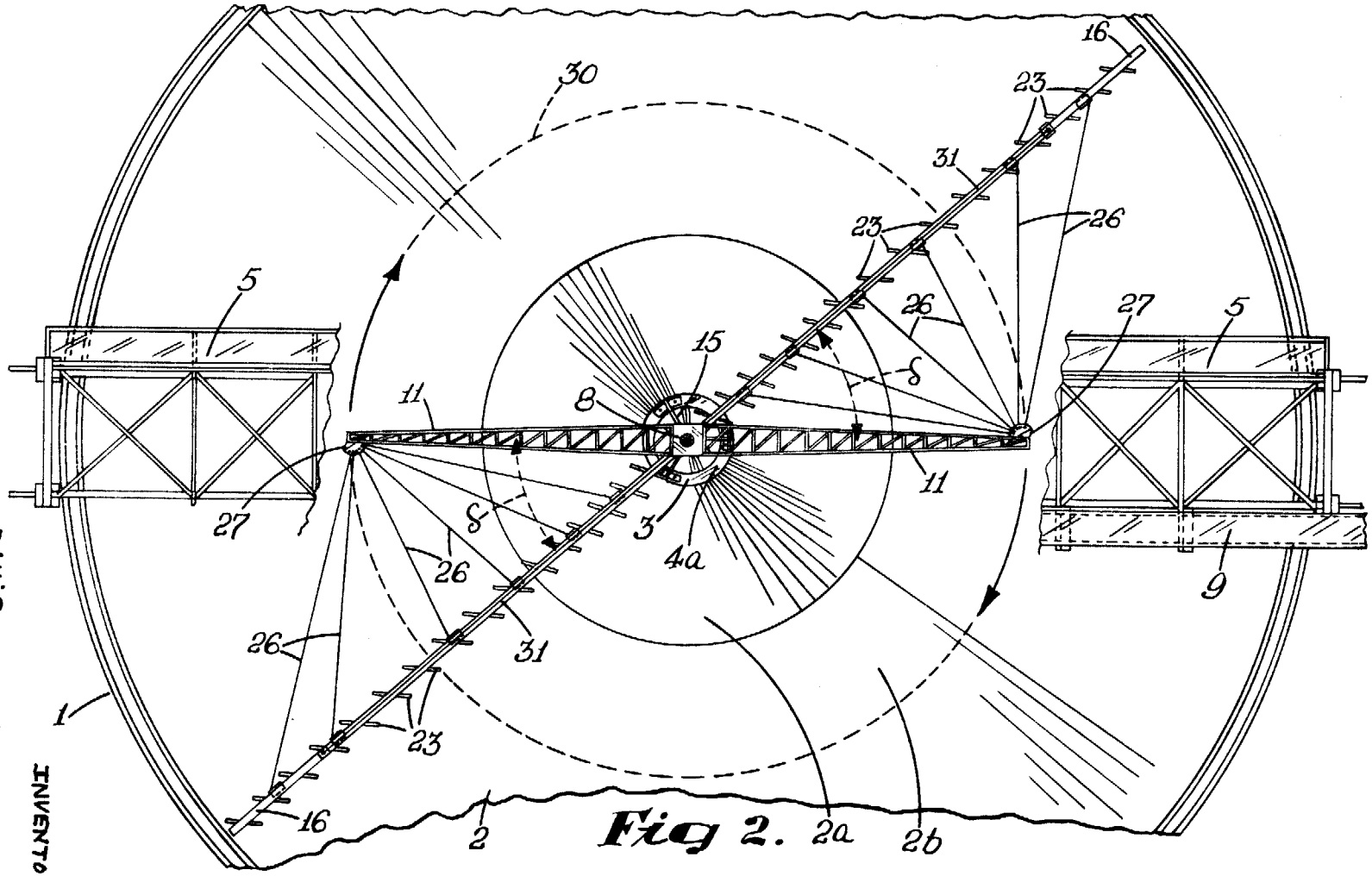
FIGURE 2 is a plan of the thickener of FIGURE 1 with parts broken away to show the raking means clearly.
Figure 3:
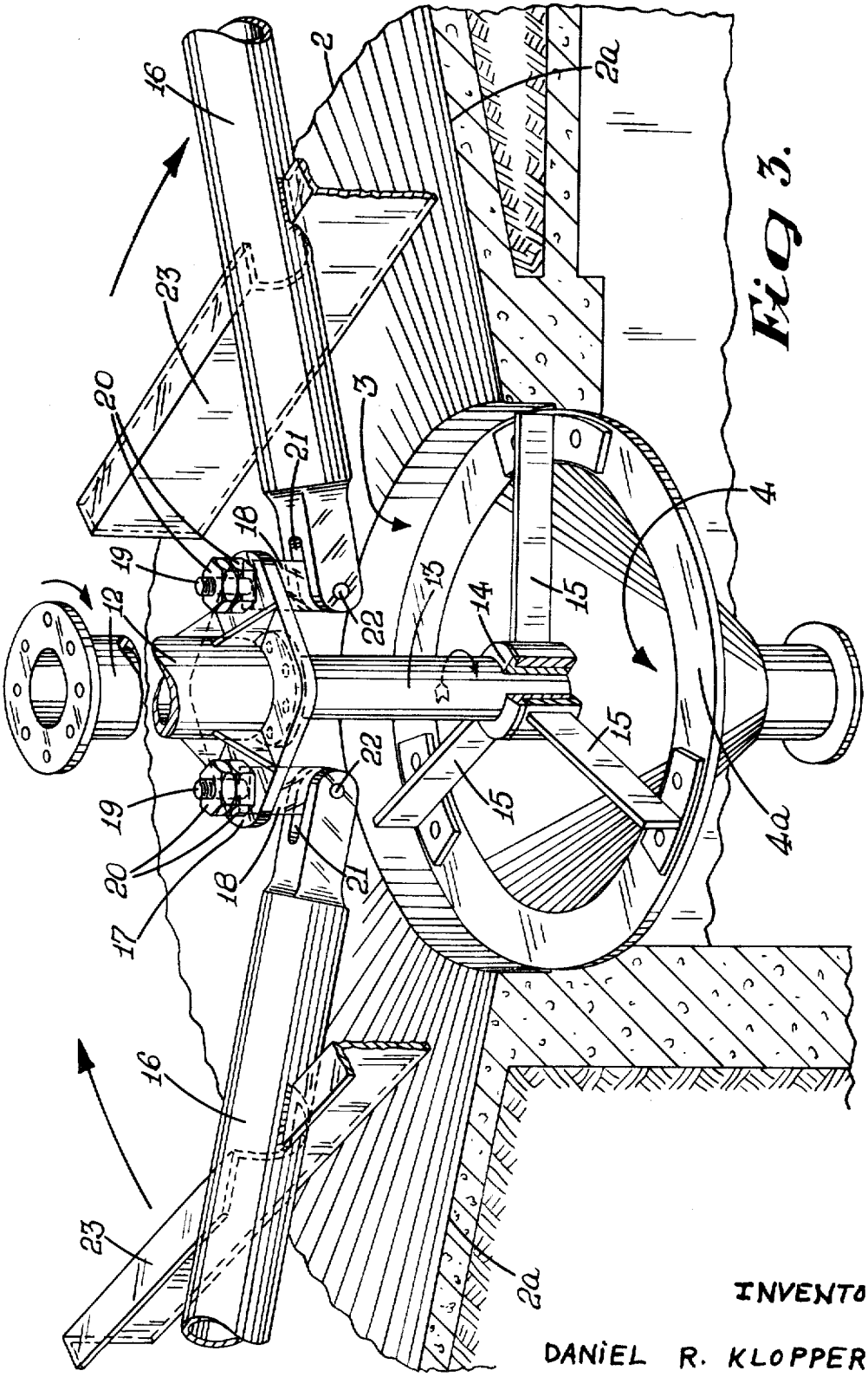
FIGURE 3 is a fragmentary perspective view to an enlarged scale of the central bottom zone of the settling tank of FIGURES 1 and 2, showing the bottom mounting of the raking means.

Referring to FIGURES 1, 2 and 3, the thickener comprises settling tank 1 having base 2 sloping downwardly and inwardly towards centrally located outlet 3 communicating with discharge funnel 4. It will be seen that base 2 comprises two portions 2a and 2b having different inclinations.

Overhead gangway 5 traverses tank 1 and carries drive means 6 including electric motor 7 drivingly coupled to vertical drive shaft 8. Motor 7 may be coupled to drive shaft 8 and drive shaft 8 may be rotatably suspended from drive means 6 or from the mounting of drive means 6 in any suitable manner as will be clear to a man skilled in the art.

Overhead feed launder 9 extends radially inwards from the edge of tank 1 and terminates in annular feed well 10.

A pair of horizontal drive arms 11 are fast with and extend radially in opposite directions away from drive shaft 8 which is arranged to be rotatably driven about its own axis. Drive arms 11 and drive shaft 8 are mounted coaxially with settling tank 1 in a position just above the water level A in tank 1.

Support shaft 12 is fast with and depends from drive arms 11 in co-axial relationship to drive shaft 8. At its lower end support shaft 12 is fast with co-axial locating shaft 13 held at its lower end in bearing 14 mounted at the bottom of tank 1 above discharge funnel 4 by means of radial arms 15 carried at their outer ends on support flange 4a of discharge funnel 4.

A pair of tubular carrier arms 16 are located within tank 1 below water level A and extend radially in opposite directions away from support shaft 12 at a suitable inclination relative to the horizontal in accordance with the slope of base 2 of tank 1.

As shown in FIGURE 3, support flange 17 is fast with the lower end of support shaft 12 and carries a pair of vertically disposed pivot members 18 presenting threaded spigots 19 passing through vertically facing apertures in flange 17 to permit rotational movement of pivot members 18 relative to flange 17 and support shaft 12 about the vertical axes of spigots 19 which are spaced from the axis of support shaft 12. Pivot members 18 are held by nuts 20 on spigots 19.

At its inner end each carrier arm 16 presents a clevis 21 receiving the lower end of a pivot member 18. Each clevis 21 is mounted on its pivot member 18 by means of a horizontal pin 22 for pivotal movement about the horizontal axis of pin 22.

It will be appreciated that carrier arms 16 are mounted at their inner ends on support shaft 12 for rotation therewith about its vertical axis. Additionally, each carrier arm 16 is mounted at its inner end for individual pivotal movement independently of the other carrier arm about a horizontal axis spaced from the vertical axis of drive shaft 8, as well as about a vertical axis spaced from the vertical axis of drive shaft 8.

A series of raking blades 23 are mounted in any suitable arrangement along the length of each carrier arm 16. As shown in FIGURE 5, each blade 23 engages its carrier arm 16 with a notch 24 and is secured to its carrier arm by means of welding 25.

A plurality of draught ropes 26 are anchored to each carrier arm 16 in spaced relationship along its length and converge upwardly and forwardly to securing plate 27 located on the outer end of the associated drive arm 11 in a position spaced from the vertical axis of rotation of drive shaft 8. As shown clearly in FIGURE 4, securing plate 27 presents a series of apertures 28 located on the circumference of a circle. Draught ropes 26 are secured each in its own aperture 28, such as by means of a shackle (not shown), so that ropes 26 diverge downwardly and rearwardly towards their carrier arm 16 from a common centre.

Referring to FIGURES 6 to 8, it will be seen that each draught rope is anchored to its associated carrier arm 16 by means of an anchor bracket 29 fast with the carrier arm 16 and extending transversely away therefrom. Plate 29a of each anchor bracket 29 leans forwardly an angle $\eta$ relative to the vertical and the associated draught rope 26 is secured to plate 29a in a position spaced from carrier arm 16.

Upon rotation of drive arms 11 with drive shaft 8 about the vertical axis of the latter, draught force acting along a closed path 30 about the vertical axis of drive shaft 8 is applied to each draught rope 26 in a position above and in advance of its associated carrier arm 16 so that the latter is dragged about the vertical axis of rotation of support shaft 12 at a suitable angle $\delta$ behind its drive arm 11. The pair of carrier arms 16 rotate together about the vertical axis of support shaft 12.

Since support shaft 12 is fast with drive arms 11 and therefore rotatably coupled to drive shaft 8, a certain amount of driving torque is likely to be transmitted to carrier arms 16 through their inner end mountings from support shaft 12. However, the inner end mountings are so close to the rotational axis of support shaft 12 that this driving torque is negligible and substantially all the driving torque is obtained from drive arms 11 and draught ropes 26.

It will be seen from FIGURE 4 that portion 27a of securing plate 27 which contains apertures 28, is bent downwardly at an angle $\beta$ to the horizontal so that the drag exerted on securing plates 27 by draught ropes 26 acts substantially in the plane of portion 27a. Also, as can be seen from FIGURE 8, each anchor bracket plate 29a leans sideways at an appropriate angle to the vertical and in an appropriate direction depending on its position along carrier arm 16 so that draught force applied to the anchor bracket 29 acts substantially in the plane of plate 29a.

By reading FIGURES 5 and 6 together, it will be seen that when carrier arm 16 moves forwardly in the direction of arrow B during operation of the thickener, a twisting moment acting anticlockwise in the direction of arrow C in FIGURE 5 is imposed on carrier arm 16 as a result of loading of raking blades 23. Anchor brackets 29 extend from carrier arm 16 in such direction that a twisting moment acting clockwise in the direction of arrow D in FIGURE 6 is imposed on carrier arm 16 as a result of draught force exerted on anchor brackets 29 by draught ropes 26. Thus, the action of draught force on carrier arms 16 counteracts twisting moments on carrier arms 16 set up by loading of raking blades 23.

In the event of the raking blades 23 of a carrier arm 16 encountering an obstacle during rotation about the vertical axis of support shaft 12, the tension in the associated draught ropes 26 increases and the carrier arm is automatically pivoted upwardly about the horizontal axis of its pivot pin 22 at its inner end. Draught ropes 26 are of fixed length and their lower ends will thus move along the circumference of circles located in generally vertical planes. Also, a carrier arm is capable of pivoting rearwardly about the vertical axis of its pivot member 18. Thus, upon being pivoted upwardly under the influence of an increase in resistance to rotational movement about the vertical axis of drive shaft 8, a carrier arm 16 will lift in rearward direction to increase the angle of lag $\delta$ of the carrier arm 16 behind its drive arm 11.

The effect of upward and rearward pivotal movement of a carrier arm 16 about the horizontal and vertical axes at its inner end, is to lift the associated raking blades 23 upwardly and rearwardly out of pulp in tank 1, thereby to decrease drag on carrier arm 16. Load on driving means 6 is therefore adjusted automatically. The load regulating action is fast acting and raking blades 23 can deal effectively with uneven distribution of pulp in tank 1.

In the event of a solid obstacle being encountered, raking blades 23 of each carrier arm 16 passing the obstacle will be lifted over the obstacle and will act to scrape the upper surface thereof. Successive passages of raking blades 23 will gradually wear away the obstacle without overloading the raking means.

Upon upward pivotal movement of a carrier arm 16, lift of the scraper blades 23 towards the inner end of the carrier arm is a minimum, so that effective sweeping in the central zone in the neighborhood of tank outlet 3 is maintained to prevent clogging.

As shown in FIGURE 1, a suspension rope 31 for each carrier arm 16 is fast at one end with the associated overhead drive arm 11 in a position adjacent the vertical axis of rotation of the latter, and fast at the other end with the carrier arm 16 in a suitable position intermediate the ends of the latter. Suspension ropes 31 merely determine the lowest position of carrier arms 16 to prevent them from scraping base 2 of tank 1 during starting and stopping. It is believed that during normal operation, tension on draught ropes 26 support carrier arms 16 in required disposition and that suspension ropes 31 are to all intents and purposes inoperative. Suspension ropes 31 do not interfere with upward and rearward pivotal movement of carrier arms 16.

With raking means according to the invention, the drive arms can be mounted entirely above the water level.

No driving torque for the blade carrier arms need be transmitted through the pivotal mounting at the inner ends of the blade carrier arms and can be applied solely through the draught elements. This permits a reduction in the structural strength, physical dimensions and weight of the blade carrier arms and their inner end mountings.

The physical dimensions of moving parts located below the water level can be kept down to a minimum in order:

(a) To present a minimum projected area in the direction of travel thereby to minimise disturbance of pulp in suspension and resistance to movement, and (b) To present a minimum settlement area for pulp in order to minimise build up of weight of moving parts, disturbance of pulp in suspension and resistance to movement.

The weight of moving parts located below water level can be reduced, thereby permitting a reduction in the size and strength and consequently the cost of support structure therefor.

Raking means according to the invention is relatively cheap and simple in design, yet effective in operation.

It will be appreciated that many variations in detail are possible without departing from the scope of the appended claims.

What I claim is:

1. A thickener comprising a settling tank; a vertical drive shaft located co-axially relative to the settling tank and arranged to be rotatably driven; a pair of drive arms located in the region of the liquid level of the settling tank, the drive arms being fast with and extending radially in opposite directions from the drive shaft; a support shaft fast with the drive arms and depending therefrom in co-axial relationship to the drive shaft; a plain tubular raking blade carrier arm for each drive arm, located within the settling tank below and rearwardly of the associated drive arm, the carrier arms extending radially in opposite directions from the support shaft and being mounted towards their inner ends on the support shaft for rotation with the support shaft about its vertical axis, each carrier arm furher being mounted towards its inner end on the support shaft for individual pivotal movement independently of the other carrier arm about a substantially horizontal axis spaced from the vertical axis of the support shaft as well as about a substantially vertical axis spaced from the vertical axis of the support shaft; and a plurality of draught elements for each carrier arm, each set of draught elements being secured to their carrier arm in positions spaced along the length of the carrier arm and each set of elements converging upwardly and forwardly from their carrier arm to a common centre zone spaced from the vertical rotational axis of the drive shaft and each set of elements being secured to the associated drive arm in their centre zone.

2. Settling apparatus comprising a settling tank; rotary raking means comprising at least a pair of raking blade carrier arms located within the settling tank in required angular relationship to the horizontal and extending radially in circumferential spaced relationship from a common, substantially vertical axis of rotation, the carrier arms being mounted towards their inner ends for rotation together about the common vertical axis and each carrier arm further being mounted towards its inner end for individual pivotal movement independently of the other carrier arm about both a substantially horizontal axis and a substantially vertical axis; and at least one elongated draught element secured to each carrier arm, whereby draught force acting along a closed path about the vertical axis of rotation of the carrier arms is applicable to each draught element in a position above and in advance of its carrier arm.

3. Settling means as claimed in claim 2, wherein the carrier arms comprise plain tubular members, and a plurality of draught elements are secured to each carrier arm in positions spaced along the length of the arm.

4. Settling means as claimed in claim 2, including a drive arm for each carrier arm, each drive arm being located above and in advance of its carrier arm, and means for rotating each drive arm substantially about the vertical axis of rotation of the carrier arms, the draught element of each carrier arm being secured to the associated drive arm.

5. Settling apparatus comprising a settling tank; rotary raking means comprising at least a pair of plain, tubular raking blade carrier arms located within the settling tank in required angular relationship to the horizontal and extending radially in circumferential spaced relationship from a common, substantially vertical axis of rotation, the carrier arms being mounted towards its inner end for individual pivotal movement independently of the other carrier arm about both a substantially horizontal axis and a substantially vertical axis; a drive arm for each carrier arm, each drive arm being located above and in advance of the associated carrier arm and arranged to be rotationally driven substantially about the vertical axis of rotation of the associated carrier arm; and a plurality of draught elements secured to each carrier arm in positions spaced along the length of the arm, the draught elements of each carrier arm converging upwardly and forwardly from their carrier arm to a common center zone spaced from the vertical rotational axis of the associated drive arm and the draught elements of each carrier arm being secured to the associated drive arm in their center zone.

6. Settling apparatus comprising a settling tank; rotary raking means comprising at least a pair of raking blade carrier arms located within the settling tank in required angular relationship to the horizontal and extending radially in circumferential spaced relationship from a common, substantially vertical axis of rotation, the carrier arms being mounted towards their inner ends for rotation together about the common vertical axis and each carrier arm further being mounted towards its inner end for individual pivotal movement independently of the other carrier arm about both a substantially horizontal axis and a substantially vertical axis; at least one elongated draught element secured to each carrier arm, whereby draught force acting along a closed path about the vertical axis of rotation of the carrier arms is applicable to each draught element in a position above and in advance of its carrier arm; and an anchor bracket fast with and extending transversely from each carrier arm, the draught element for each carrier arm being secured to the associated anchor bracket in a position spaced from the carrier arm and the anchor bracket extending in a direction whereby twisting moment on the carrier due to draught force on the draught element acts in opposite direction to twisting moment on the carrier arm due to loading of raking blades on the carrier arm during operation.

7. Settling apparatus comprising a settling tank; rotary raking means comprising at least a pair of plain, tubular raking blade carrier arms located within the settling tank in required angular relationship to the horizontal and extending radially in circumferential spaced relationship from a common, substantially vertical axis of rotation, the carrier arms being mounted towards their inner ends for rotation together about the common vertical axis and each carrier arm further being mounted towards its inner end for individual pivotal movement independently of the other carrier arm about both a substantially horizontal axis and a substantially vertical axis; a drive arm for each carrier arm, each drive arm being located above and in advance of the associated carrier arm and arranged to be rotationally driven substantially about the vertical axis of rotation of the associated carrier arm; a plurality of anchor brackets fast with each carrier arm in positions spaced along the length of the carrier arm, each anchor bracket extending transversely from its carrier arm; and an elongated draught element for and secured to each anchor bracket in a position spaced from the associated carrier arm, the draught elements of each carrier arm converging upwardly and forwardly from their carrier arm to a common center zone spaced from the vertical rotational axis of the associated drive arm and secured to the associated drive arm in a direction whereby twisting moment on the carrier arm due to draught force on the associated draught element acts in opposite direction to twisting moment on the carrier arm due to loading of raking blades on the carrier arm during operation.

8. Raking means for settling apparatus incorporating a settling tank, comprising at least a pair of raking blade carrier arms locatable within the settling tank in required angular relationship to the horizontal to extend radially in circumferential spaced relationship from a common, substantially vertical axis of rotation, the carrier arms being mountable towards their inner ends for rotation together about the common vertical axis and each carrier arm further being mountable towards its inner end for individual pivotal movement independently of the other carrier arm about both a substantially horizontal axis and a substantially vertical axis.

9. Raking means as claimed in claim 8, wherein the carrier arms comprise plain tubular members, and a plurality of draught elements are secured to each carrier arm in positions spaced along the length of the arm, draught force acting along a closed path about the vertical axis of rotation of the carrier arms being applicable to each draught element in a position above and in advance of its carrier arms.

10. Raking means for settling apparatus incorporating a settling tank, comprising at least a pair of raking blade carrier arms locatable within the settling tank in required angular relationship to the horizontal to extend radially in circumferential spaced relationship from a common, substantially vertical axis of rotation, the carrier arms being mountable towards their inner ends for rotation together about the common vertical axis and each carrier arm further being mountable towards its inner end for individual pivotal movement independently of the other carrier arm about a substantially horizontal axis as well as about a substantially vertical axis; a drive arm for each carrier arm, each drive arm being located above and in advance of the associated carrier arm and arranged to be rotationally driven substantially about the vertical axis of rotation of the associated carrier arm; and a plurality of draught elements secured to each carrier arm in positions spaced along the length of the arm, the draught elements of each carrier arm converging upwardly and forwardly from their carrier arm to a common center zone spaced from the vertical rotational axis of the associated drive arm and the draught elements of each carrier arm being secured to the associated drive arm in their center zone.

11. Raking means for settling apparatus incorporating a settling tank, comprising at least a pair of raking blade carrier ams locatable within the settling tank in required angular relationship to the horizonal to extend radially in circumferential spaced relationship from a common, substantially vertical axis of rotation, the carrier arms being mountable towards their inner ends for rotation together about the common vertical axis and each carrier arm further being mountable towards its inner end for individual pivotal movement independently of the other carrier arm about a substantially horizontal axis as well as about a substantially vertical axis; a drive arm for each carrier arm, each drive arm being located above and in advance of the associated carrier arm and arranged to be rotationally driven substantially about the vertical axis of rotation of the associated carrier arm; a plurality of anchor brackets fast with each carrier arm in positions spaced along the length of the carrier arm, each anchor bracket extending transversely from its carrier arm; and an elongated draught element for and secured to each anchor bracket in a position spaced from the associated carrier arm, the draught elements of each carrier arm converging upwardly and forwardly from their carrier arm to a common center zone spaced from the vertical rotational axis of the associated drive arm and secured to the associated drive arm in their center zone, each anchor bracket extending from its carrier arm in a direction whereby twisting moment on the carrier arm due to draught force on the associated draught element acts in opposite direction to twisting moment on the carrier arm due to unloading of raking blades on the carrier during operation.

12. Raking means for settling apparatus incorporating a settling tank, comprising a raking blade carrier arm locatable within the settling tank in required angular relationship to the horizontal and mountable towards one end for rotation about a substantially vertical axis and for pivotal movement about a substantially horizontal axis as well as about a substantially vertical axis; and at least one anchor bracket fast with and extending transversely from the carrier arm, a draught element being securable to the anchor bracket in a position spaced from the carrier arm and the anchor bracket extending in a direction whereby twisting moment on the carrier arm due to draught force on the draught element acts in the opposite direction to twisting moment on the carrier arm due to loading of raking blades on the carrier arm during operation.

*13. A raking mechanism for use in a settling tank comprising at least one elongated arm carrying raking devices thereon and extending out substantially radially from a vertical axis of rotation, a drive member also mounted for rotation about the vertical axis and located at a level substantially above the rake arm and forwardly thereof with respect to the direction of rotation, at least one draught element extending forwardly and upwardly from the rake arm to the drive member, and mounting means at the inner end of the rake arm to permit the rake arm to swing rearwardly and upwardly about its inner end in a path which is arcuate about a swing axis defined by the inner end of the rake arm and the interconnection of the draught element and the drive member.*

*14. A raking mechanism as defined in claim 13, said mounting means at the inner end of the rake arm being structured to prevent the rake arm from twisting about its own longitudinal axis.*

*15. A raking mechanism as defined in claim 14, said mounting means at the inner end of the rake arm incorporating two pivot axes which are transverse to each other and which are also transverse to the rake arm.*

*16. A raking mechanism as defined in claim 15, one of said pivot axes being oriented substantially horizontally and the other being oriented substantially vertically.*

*17. A raking mechanism as defined in claim 13 including an anchor bracket mounted on the rake arm to extend transversely therefrom, the draught element being connected to the anchor bracket at a position such that the twisting moment on the rake arm due to the draught force acts in a direction opposite to the twisting moment on the rake arm due to drag on the raking devices during operation of the mechanism.*

*18. A raking mechanism as defined in claim 13 including a plurality of such rake arms extending out radially in circumferentially spaced relationship from a common vertical axis of rotation, each rake arm having a respective drive member and draught element therefor, the mounting means at the inner end of the respective rake arms permitting each arm to swing rearwardly and upwardly independently of the other rake arms.*

*19. A raking mechanism as defined in claim 18, said drive members being arms extending out radially from the vertical axis of rotation and being rigidly interconnected at their inner ends, the draught elements being connected to the drive arms a substantial distance out from the vertical axis of rotation.*

*20. A raking mechanism as defined in claim 19 including a vertically extending center structure connected to the drive arms for rotation on said vertical axis, the mounting means at the inner end of the rake arms being mounted on the center structure for rotation therewith.*

*21. A raking mechanism as defined in claim 19, said rake arms each having a straight tubular construction whereby the projected area of the rake arms in the direction of travel is minimized thereby reducing drag on the arms during operation.*

*22. A raking mechanism as defined in claim 21, each rake arm being drawn by a plurality of draught elements spaced along the length of the rake arm, the draught elements for each arm converging to a common center zone at the respective drive arm whereby the rake arm and its draught elements may rotate as a plane about an axis passing through the center zone and the mounting means at the inner end of the rake arm.*

*23. A raking mechanism for use in a settling tank comprising a plurality of long straight arms carrying raking devices thereon, the rake arms extending out radially in circumferentially spaced relationship from a common vertical axis about which they rotate, each arm having a tubular construction whereby the projected area of the rake arms in the direction of travel is minimized thereby reducing drag on the arms during operation; a plurality of drive arms extending out radially from the vertical axis of rotation and being rigidly interconnected at their inner ends, each drive arm being located above a respective rake arm and forwardly thereof with respect to the direction of rotation; a plurality of draught elements spaced along the length of each rake arm and extending from the rake arm forwardly and upwardly to a respective drive arm, the draught elements for each rake arm converging at a common center zone at the respective drive arm thereby adapting the rake arm and its draught elements to swing as a plane about an axis passing through the center zone and the inner end of the rake arm; and mounting means at the inner end of the rake arms to permit each rake arm to swing rearwardly and upwardly about its inner end independently of the other rake arms, said mounting means incorporating two pivot axes which are transverse to each other and which are transverse to the rake arm whereby each rake arm is mounted for universal swinging about its inner end while being restrained against twisting about the longitudinal axis of the rake arm.*

References Cited

The following references, cited by the Examiner, are of record in the patented file of this patent or the original patent.

UNITED STATES PATENTS

| | | | |
|---|---|---|---|
| 964,935 | 7/1910 | Baril | 259—108 |
| 2,322,720 | 6/1943 | Scott | 259—108 |
| 2,557,316 | 6/1951 | Scott | 210—531 |
| 3,166,502 | 1/1965 | Kelly | 210—528 |

FOREIGN PATENTS 583,273 12/1946 Great Britain.

ROBERT W. JENKINS, Primary Examiner

U.S. Cl. X.R.

210—528